UNITED STATES PATENT OFFICE.

THOMAS NEWSOME, OF ROSLINDALE, MASSACHUSETTS, ASSIGNOR, BY MESNE ASSIGNMENTS, TO AMERICAN BY-PRODUCTS COMPANY, OF NEW JERSEY.

DYE FROM COTTON-SEED AND METHOD OF MAKING SAME.

SPECIFICATION forming part of Letters Patent No. 683,786, dated October 1, 1901.

Application filed October 8, 1900. Renewed April 22, 1901. Serial No. 56,916. (No specimens.)

*To all whom it may concern:*

Be it known that I, THOMAS NEWSOME, of Roslindale, county of Suffolk, State of Massachusetts, have invented a new and Improved Process of Manufacturing Dyes and the Product Thereof, of which the following is a specification.

My invention relates to the art of manufacturing dyes, its object being to devise a new process for the extracting of the coloring-matter existing in cotton-seed, particularly as it is found in the by-products of cotton-seed-oil manufacture—viz., the hulls or bran and the cake; and it consists in the process of treatment of said materials and the product derived by means of said process, both as hereinafter particularly described and claimed.

Cotton-seed contains in its natural state not only a strong coloring-matter, but also a considerable amount of oils, fatty acids, and gums, which latter render the extracting of the coloring-matter extremely difficult. In fact, the processes thus far known to the trade are either so complicated and expensive or the product derived therefrom of such character, not being readily available for use as a dye, that to my knowledge no such process nor product has proved of practical value or formed the basis of actual manufacture. The particular characteristic of such prior products which renders them unavailable as dyes is their insolubility in water, it being well known that for most efficient use in the art of dyeing it is essential that the color used be totally soluble in water.

My process is designed and adapted for the treatment of the by-products derived from cotton-seed in connection with the manufacture of oil therefrom—viz., the hulls or bran and the cake or solid residuum after the oil has been expressed. By my improved process I seek first to overcome the natural insolubility of the coloring-matter, which is caused by the presence in said seed and by-products of oils, fatty acids, and gums. This is accomplished by treating the material with the vapor of a liquid hydrocarbon—such, for example, as naphtha—preferably by placing the material either in bulk or, if bran, in its original bales in a suitable digester with which a hydrocarbon-vapor generator is connected in a circulating cycle. The vapor as produced in the generator is conveyed by the pipes of the system preferably to the upper end or part of the digester, whence it is forced downward and through the material, dissolving the oils, fatty acids, and gums and being itself condensed into liquid. This liquid as it passes through the material carries with it the dissolved oils, fatty acids, and gums into the generator. Here the hydrocarbon is again vaporized and again passed around through the digester, the operation being continued until all of the oils, fatty acids, and gums have been dissolved and carried away from the solid material. The generator is then preferably disconnected or cut off from the digester and hot air forced through the latter to carry off and free the material from all traces of the hydrocarbon. The material is then removed from the digester and subjected to treatment for the dissolving and extracting of the color. This may be accomplished in various ways, but that which I prefer is described as follows: I first macerate or steep the bran or cake in cold water for several hours until decomposition commences, accompanied by the generating of ammoniacal gas. I then preferably place the macerated material in a steam-extractor and subject it to the action of steam under such conditions of heat and pressure as may be practicable or desirable—that is, for about two and one-half hours—until the coloring-matter is practically all dissolved and taken up by the water of condensation, constituting a watery extract of the color, which may then be drained away from the solid matter. Instead of subjecting the macerated material to such treatment by steam in an extractor it may be simply boiled in an open vessel to obtain the watery extract; but this is a less efficient and satisfactory process. This watery extract may be used directly as a dye, but is preferably concentrated by evaporation, so as to reduce its bulk for handling, transportation, and sale, it being diluted the required degree when it is to be used.

It is to be noted that my new process as above described involves no saponification; also, that this process relates solely to the treatment of cotton-seed material, particularly the hulls or bran, as distinguished from the pods which envelop the seeds and fiber. My new product also is to be distinguished from the color extracted from the root of the cotton-plant.

I claim—

1. The herein-described process of treating cotton-seed material to extract the color therefrom, consisting in first treating the material with hydrocarbon vapor under pressure to remove the oils, fatty acids and gums, and afterward dissolving and washing out the color therefrom.

2. The herein-described method of extracting coloring-matter from cotton-seed material, which consists in first eliminating from said material the oils, fatty acids and gums by means of a suitable solvent, without saponification; then eliminating the solvent from the material, and then dissolving and washing out the color therefrom.

3. The herein-described process of treating cotton-seed bran or cake to extract the color therefrom, which consists in first treating the material with a hydrocarbon vapor under pressure until the oils, fatty acids and gums have been thereby dissolved and carried away; then eliminating the solvent from the material; then treating the material with steam under pressure until the color has been dissolved, and then drawing off the watery extract.

4. The herein-described process of extracting the coloring-matter from cotton-seed material which consists in first subjecting the material in a suitable digester to the action of hydrocarbon vapor under pressure to dissolve and carry away the oils, fatty acids and gums; then passing a current of hot air through the mass to remove the hydrocarbon; then macerating the material in cold water, and then treating said macerated material with steam under pressure in a suitable extractor, substantially as described.

5. The herein-described process for extracting the color from cotton-seed cake or bran, consisting in first subjecting the material in a digester to hydrocarbon vapor in circulation under pressure, until the oils, fatty acids and gums have been dissolved and removed from the material; then subjecting the material to a current of air to carry away the residual hydrocarbon; then macerating the material in cold water until decomposition commences; then subjecting the material to steam under pressure until the coloring-matter is dissolved, and then drawing the same off from the material in the form of watery extract, all substantially as described.

6. As a new product, the coloring-matter of cotton-seed in the form of a water-soluble extract.

7. As a new article of manufacture, the described dye consisting of the coloring-matter of cotton-seed, its bran or cake, in the form of a watery extract, free of oils, fatty acids and gums.

Signed at New York this 12th day of September, 1900.

THOMAS NEWSOME.

Witnesses:
 FRANK S. GANNON, Jr.,
 T. D. MERWIN.